United States Patent [19]
Fisher

[11] 3,860,984
[45] Jan. 21, 1975

[54] INFLATABLE LIFE RAFT ESCAPE SLIDE

[75] Inventor: John M. Fisher, Cuyahoga Falls, Ohio

[73] Assignee: The B. F. Goodrich Company, New York, N.Y.

[22] Filed: June 25, 1973

[21] Appl. No.: 373,119

[52] U.S. Cl. .................. 9/11 A, 182/48, 193/25 B, 244/DIG. 2
[51] Int. Cl. ......................... B63c 9/04, B64d 25/14
[58] Field of Search ........... 244/137 P; 9/11 A, 2 A; 193/25 B; 182/48, 20; 14/27; 52/2, 225

[56] References Cited
UNITED STATES PATENTS

| | | | |
|---|---|---|---|
| 2,399,494 | 4/1946 | Manson et al. | 9/11 A |
| 2,531,549 | 11/1950 | Boyd | 9/11 A X |
| 2,577,582 | 12/1951 | Hammitt et al. | 52/225 X |
| 3,339,218 | 9/1967 | Stamberger | 9/11 A |
| 3,458,009 | 7/1969 | Favors | 182/48 |
| 3,473,641 | 10/1969 | Fisher | 193/25 |
| 3,669,217 | 6/1972 | Fisher | 182/48 |
| 3,679,025 | 7/1972 | Rummel | 182/20 |
| 3,712,417 | 1/1973 | Chacko | 182/48 |

FOREIGN PATENTS OR APPLICATIONS

| | | | |
|---|---|---|---|
| 1,206,936 | 9/1970 | Great Britain | 182/48 |

*Primary Examiner*—Trygve M. Blix
*Assistant Examiner*—Galen L. Barefoot

[57] ABSTRACT

An improved inflatable life raft escape slide having a plurality of inflatable tube members that are cooperable with a panel member to provide a sliding surface. Such tube members are strengthened by one or more narrow transversely extending inflatable tube members having struts interconnecting the underside thereof so that when all the tube members are fully inflated the slide assumes a truss-like structure capable of supporting substantial loads. Such slide member is cooperative with a deflatable pusher member that deploys the slide and wherein such slide converts into a raft.

10 Claims, 12 Drawing Figures

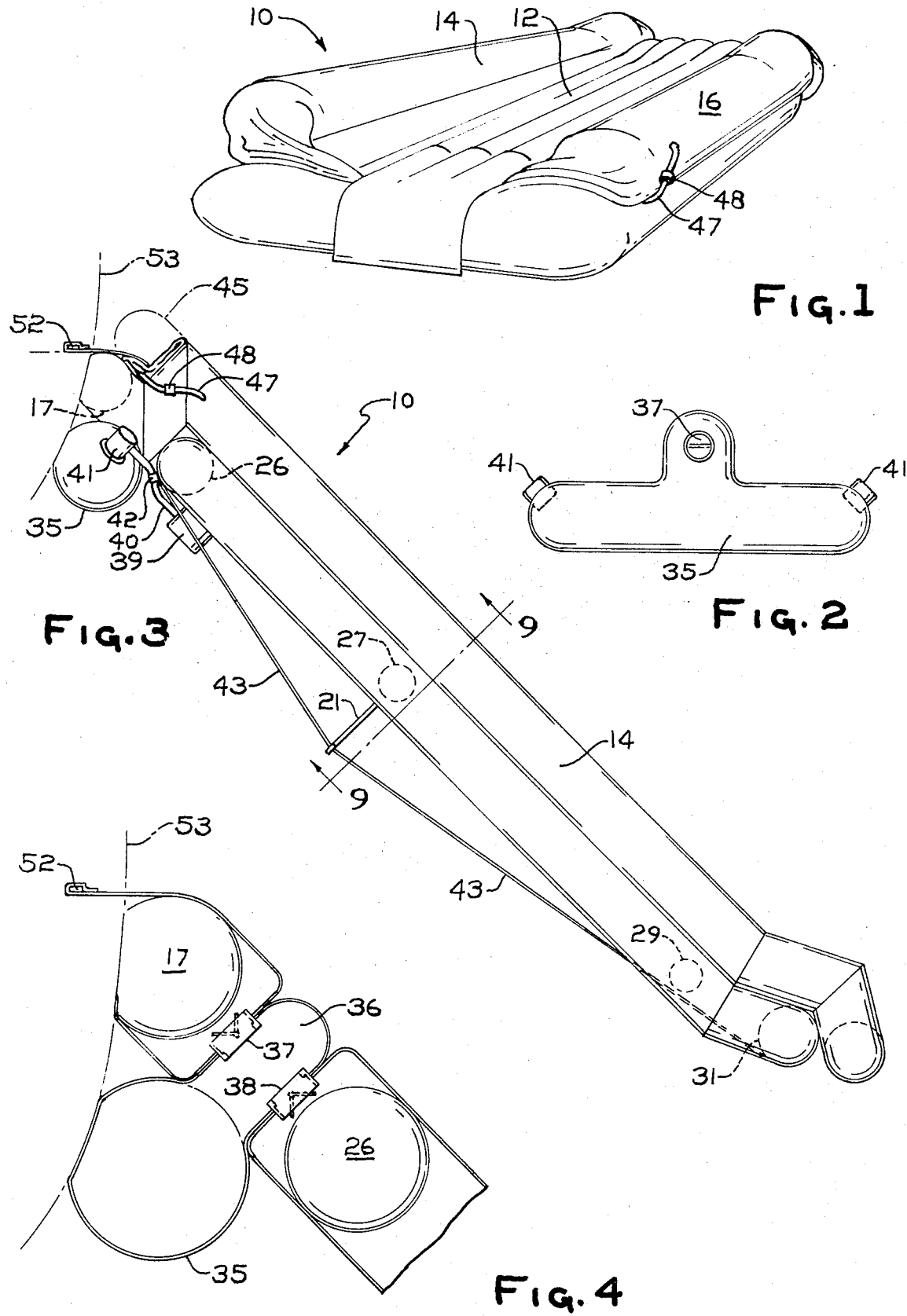

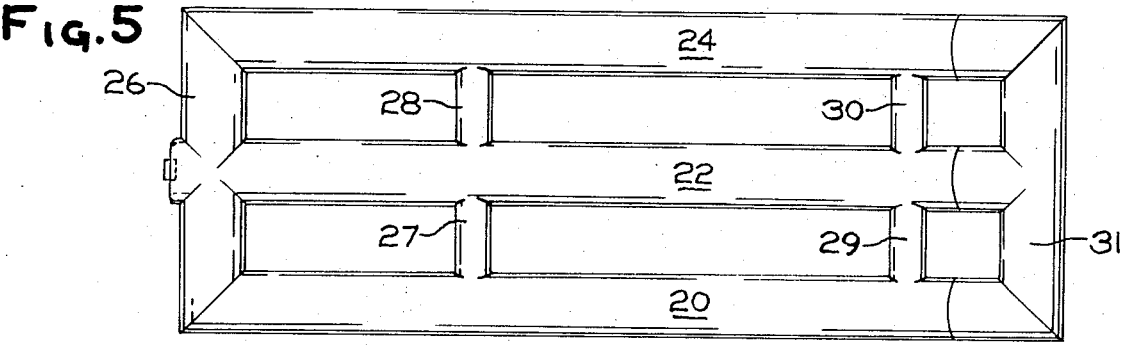
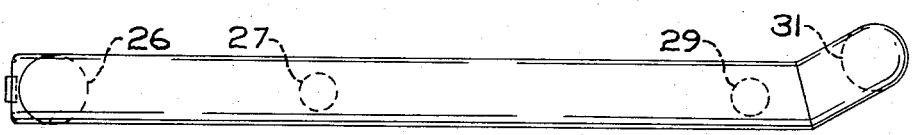
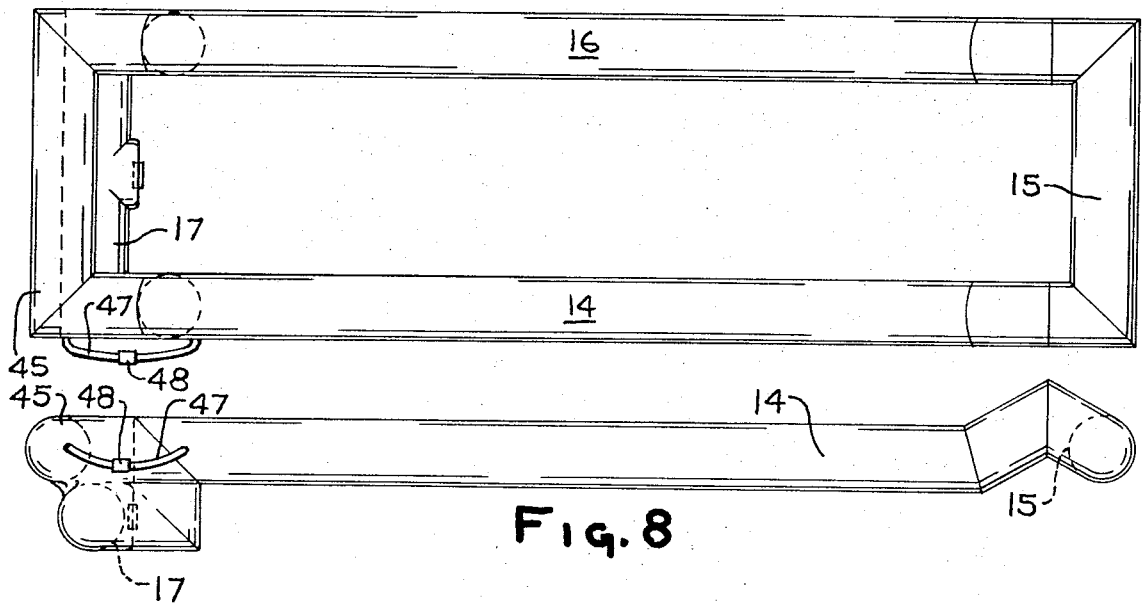
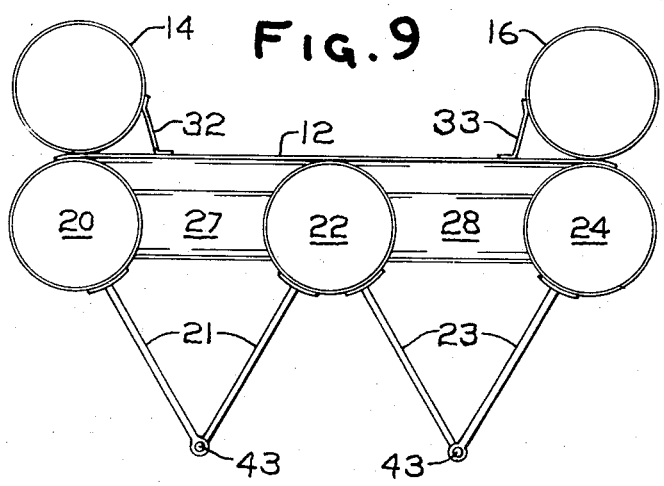

INFLATABLE LIFE RAFT ESCAPE SLIDE

BACKGROUND OF THE INVENTION

This invention relates to inflatable life raft escape slides and more particularly to an improved escape slide that is espically suitable for emergency evacuation of passengers from disabled aircraft and which slides may also be used as a life saving raft at sea.

In the event of an aircraft emergency, such as a crash landing, crash takeoff, or where the aircraft is ditched at sea, it is often necessary to evacuate the passengers from the aircraft as quickly as possible due to the danger of fire and explosion. In most instances, it is not feasible to provide an exterior set of stairs for passengers to use in emergency situations and it is necessary to provide some emergency means such as escape slides that are quickly deployable to permit the passengers to slide down from the aircraft's exit to the ground or to the water away from the aircraft. These escape slides are generally stored in a folded condition at the foot of an emergency exit so that they may be readily available in the event of an emergency.

The simplest form of escape slide consists of a flexible sheet having one end attached at the foot of the emergency exit door. To form an escape slide the unattached portion of the sheet is merely dropped from the emergency door to the ground. Then, the opposite unattached end of the sheeting is held taut by two crewmen or passengers so that the sheet forms a semirigid slide onto which the passengers may safely descend by merely sliding down such a slide. These types of slides are obviously undesirable since they require that personnel first descend from the aircraft in order to be in a position for holding the unattached end of the escape slide. Fluid distensible slides have replaced such escape slides. The prior inflatable slides are generally designed for a specific length to exit height ratio to assure a safe descent and sufficient strength in the slide to support the normal loads exerted on the slide by descending passengers. Such slides are generally bulky.

As the size of airliners increase to accommodate more passengers, the problems of evacuating these passengers from the airliner as quickly as possible increases substantially. Further, it is desirable to provide means to insure the safety of passengers in the water after they have evacuated the aircraft. In the instant invention an inflatable escape slide has been designed that doubles as a life raft device yet has the features of compactness, durability with means for quickly deploying the slide and wherein such device can operate as a raft with the feature of great stability and good flotation characteristics.

SUMMARY OF THE INVENTION

The present invention contemplates as inflatable life raft escape slide device that has a plurality of inflatable tube members with a slide portion thereon, which structure is reinforced by strut-like means capable of supporting substantial loads yet not displacing a large amount of water to insure stability when used as a raft. The slide has a pusher tube connected to the upper end portion thereof to facilitate the deployment of the slide device from the aircraft yet which pusher tube automatically deflates to increase the stability of the slide device.

BRIEF DESCRIPTION OF THE DRAWINGS

The following description and drawings illustrate two preferred inflatable escape slide constructions made according to and incorporating the embodiments of this invention.

In the drawings:

FIG. 1 is a perspective diagrammatic view;

FIG. 2 is a front elevational view of a pusher tube;

FIG. 3 is a side elevation of an inflatable slide extending from the foot of an aircraft exit, shown in phantom lines;

FIG. 4 is an enlarged cross-sectional view of the inflatable escape slide portion adjacent to the aircraft exit;

FIG. 5 is a fragmentary plan view of the lower section of the escape slide;

FIG. 6 is a side elevational view of the lower section of the escape slide;

FIG. 7 is a fragmentary plan view of the upper section only of the escape slide;

FIG. 8 is a side elevational view of the upper section of the escape slide;

FIG. 9 is a cross-sectional view of the inflatable escape slide of FIG. 2 taken on lines 9—9;

DETAILED DESCRIPTION

Figure 10:
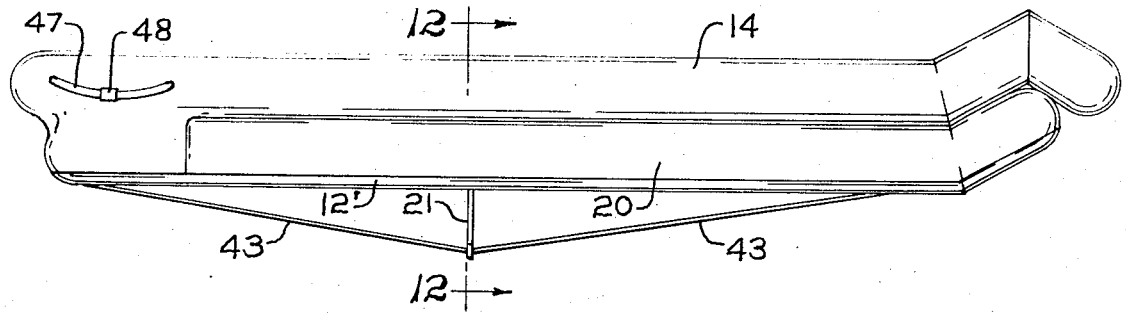
FIG. 10 is a side elevational view of a modified form of inflatable escape slide.

Referring now to the drawings, wherein like reference characters designate like or corresponding parts throughout the several views, there is shown in FIGS. 1 and 3 a life raft escape slide consisting of an upper section (FIGS. 7 and 8) and a lower section (FIGS. 5 and 6) that are suitably secured or bonded together to form a unitary slide raft 10. The upper section of the slide 10 has a pair of longitudinally extending inflatable tube members 14 and 16 interconnected at the respective end portions by laterally extended tube members 15 and 17. The lower portion of slide 10 has a plurality of longitudinally extending tube members 20, 22, and 24 interconnected by laterally extending tube members 26, 27, 28, 29, 30, and 31, wherein tube members 26 and 31 are at the respective end portions thereof. The upper and lower sections of slide 10 are interconnected by suitable means to form a unitary whole. The slide 10 has a panel member 12 extending across the full length of the upper portion and, as depicted by FIG. 9, is sandwiched between the respective tube members 14–20 and 16–24 prior to the bonding of such upper and lower sections together to form a slide member.

The escape slide 10 is fabricated from an air impervious preferably rubber coated material such that slide member 12 cooperates with the respective tube members 20 through 31 to provide a slide member that is generally rectangular in cross section to assure a substantially flat and stable slide surface. A pair of spaced panel members 32–33 may be attached to the respective sides of tube members 14 and 16 and the slide member 12 to assure the smooth safe evacuation of passengers down the slide in their exit from a disabled aircraft. An inflatable pusher tube 35 is suitably secured to the lower portion of the slide 10 such that its upper portion forms a chamber 36 that is disposed between the respective tube members 17 and 26 of the respective upper and lower sections of slide 10 as shown in FIG. 3. Such pusher tube 36 is generally T-shaped, having its longer portion lying along the bottom portion of the slide 10 while the leg portion of the T extends upwardly between tube members 17 and 26. Such chamber 36 of pusher tube 35 communicates with the respective tubes 26 and 17 via a flapper valve or a oneway inlet valve 37 and 38 to control the pressurization of the respective upper and lower portions of the slide 10. A suitable source of pressurized gas or air, such as a container or bottle of compressed gas 39, is mounted on the underside of slide 10, which bottle 39 is connected via conduit 40 to aspirators 41 located on each side portion of pusher tube 35. Such conduit 40 may be Y-shaped to have a single connection to bottle 39 and the two respective branch connections to the aspirators 41. Suitable valve means 42 (FIG. 3) on conduit 40 controls the pressurization of the pusher tube 35. Manipulation of such valve 42 can be done via a lanyard, which, upon actuation, will inflate the respective upper and lower sections of the slide 10. During the pressurization of such slide 10, aspirators 41 facilitate the pressurization thereof but upon completion of such pressurization, aspirators 41 permit the pusher tube 35 to deflate to improve the stability of the life raft escape slide's use as a raft. Suitably mounted on the upper end portion of the slide 10 is an elongated U-shaped auxiliary tube member 45 whose upper portion is substantially in line with the top surface portion of tube 14. The U-shaped auxiliary tube member 45 is a closed tube interconnected with tube 14 via conduit 47 and a valve 48 as shown in FIG. 9. Tube member 45 is in a deflated condition as shown in FIG. 10 and upon manipulation of the valve 48 will bleed off sufficient air or gas from the upper section of the slide 10 to distend tube member 45 into the condition shown in FIG. 7 and insure such slide's operation as a raft and protect the occupants thereof from the waves. Suitably connected to the intermediate bottom surface of the lower portion of slide 10 are pairs of strut members 21—21 and 23—23. The upper portions of these strut members are suitably journaled to bosses that are bonded to the lower portions of tube members 20, 22, and 24 and with the respective other ends of such strut members being hinged to facilitate the packing of such slide 10 in its deflated condition into a compact package. A pair of cables 43 (only one visible in FIG. 2) extend from the forwardmost portion of slide 10 to the rearwardmost portion of such slide, having its intermediate portion secured to the respective hinge portions of struts 21—21 and 23—23. In the fully inflated condition of slide 10, such cables 43 and struts 21—21 and 23—23 operate to provide the necessary tension to the slide 10 to maintain it in a rigid condition for operation as an escape slide without interfering with its functioning as a raft since the displacement of the water is negligible. In lieu of the compressed gas container 39 separate inflation means, pumps or devices may be located on the aircraft and connected directly to the aspirator to facilitate the pressurization of the slide 10.

In utilizing the inflatable life raft escape slide 10, the slide 10 is folded into a relatively small package which is stored in a hidden compartment at the base of the exit door. The slide is attached to the aircraft by means of a suitable attachment strap 52. Such strap 52 may be readily removed in a manner old and well known in the art to permit the separation of the escape slide from the aircraft. When an aircraft becomes disabled and upon opening of the exit doors such folded package falls out of the exit portion of the aircraft. Simultaneously with such action, the inflation device 39 is activated by a lanyard connected to valve 42 which communicates the pressurized gas via aspirators 41 to the pusher tube 35. Such pusher tube quickly deploys the escape slide outwardly away from the disabled aircraft. The compressed gas via aspirators 41 and pusher tube 35 pressurizes the respective upper and lower sections of the escape slide via one-way valves 37 and 38. Valve 38 pressurizes the lower portion of the slide via tube member 26 and tube member 20–22. the laterally extending tube members 27–28, 29 and 30 interconnecting the respective tube members 20 and 22, facilitate the rapid inflation of such tube members. The upper section of slide 10 is inflated via one-way valve 37 and laterally extending tube 17. During the inflation of such slide 10 the struts 21-23 are quickly deployed and the cables 43 stabilize the struts and provide a rigid support as slide 10 becomes fully deployed. The escape slide in this condition is in positio for use and upon completion of its mission as an escape slide is quickly deployed as a raft by the separation of the slide 10 from the aircraft by the means of detachable strap 52. Detachment of the slide from the aircraft positions the escape slide 10 into a horizontal position upon the surface of the water. Valve 48 is then actuated to bleed off a portion of the compressed air stored in the upper section of the slide 10 to the U-shaped tube 45 which prevents the waves from coming into the raft. Such slide 10 will float without the inflation of tube 45 but its operation as a raft is enhanced materially by the use of such auxiliary tube. With the pusher tube 35 deflated since the aspirators 41 permit the exit of the air, little water is displaced thereby, so that the raft is stable and fully operative as an escape life raft slide. The struts 21-23 similarly displace little water and enhance the raft's capability for stable flotation. A cover may be placed on the aspirators; however, in most instances the aspirator may be left uncovered and water may be allowed to flow therein such as to fill the lower portion of the pusher tube 35 to act as ballast for the raft and further stabilize the escape slide raft's use as a raft.

Figure 11:
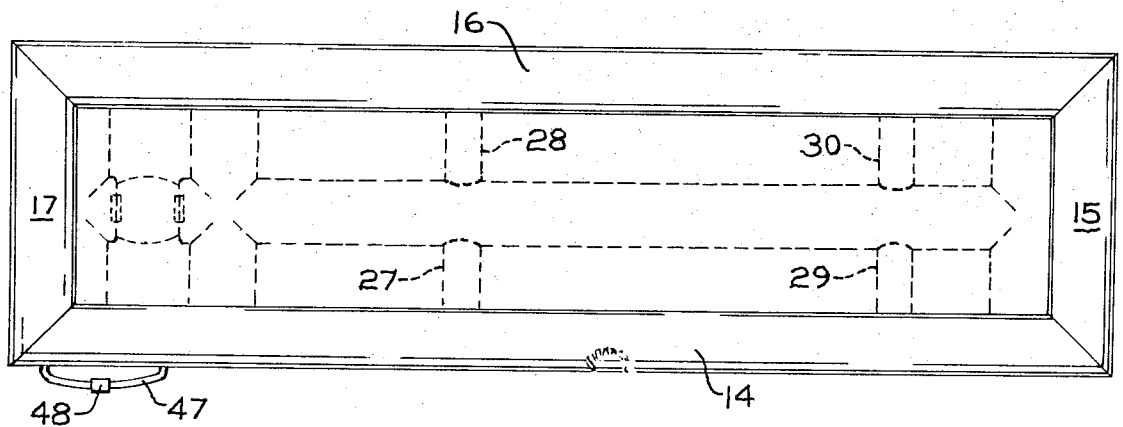
FIG. 11 is a plan view of the modified form of inflatable escape slide shown in FIG. 10.
Figure 12:
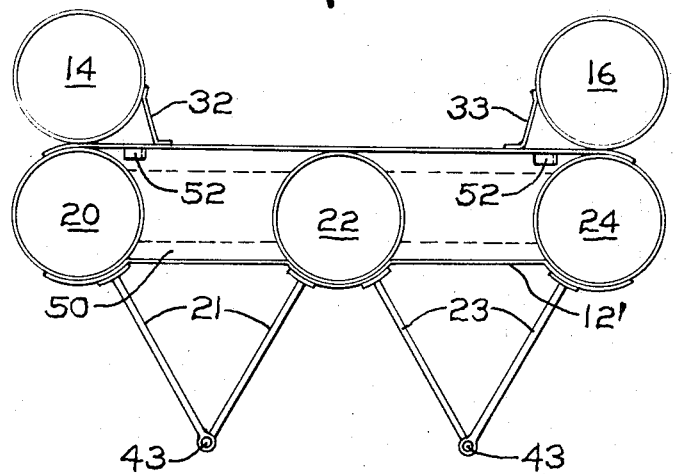
FIG. 12 is a cross-sectional view of the inflatable escape slide of FIG. 10 taken on lines 12—12 thereof.

The modified form of the invention shown in FIGS. 11 through 12 is substantially similar in all respects to the original described embodiment and wherein the numerals applicable are the same throughout; however, herein a second cover member 12' is suitably attached to the entire lower portion of the escape slide such that it cooperates with the respective tubes 20, 22 and 24 and the cover of slide member 12 to form a chamber 50 which insulates the occupants of the raft from the cold water on which it floats. Chamber 50 is closely adjacent to the side portions of the tubes 14 and 16 such that upon deployment as a raft, such valves 52 may be operated to admit air at atmospheric pressure. the side panels 32-33 are perforated to allow the flow of air through such check valves 52 into the chamber 50. The operation of such modified form of the invention is the same as that described above with exception that the panel or cover member 12' provides for the insulation of the passengers thereby permitting such passengers to remain on the raft for a longer period of time in the ice cold waters.

Various modifications are contemplated and may obviously be resorted to by those skilled in the art without departing from the described invention, as hereinafter defined by the appended claims, as only preferred embodiments thereof have been disclosed.

I claim:

1. An inflatable escape slide raft comprising an inflatable upper section and an inflatable lower section, said upper section having a slideway surface for the discharge of aircraft passengers therefrom, detachable means operative to connect and disconnect said slide raft to and from an aircraft; a pusher tube mounted at one end of said slide raft; said pusher tube having a chamber communicating with said upper and lower section through separate flapper valve means, truss means secured to the underneath portion of said slide structure to maintain said slide structure in rigid condition upon inflation of said upper and lower sections, a pressurizing gas means mounted on said slide raft, valve means mounted on said gas means operative upon actuation to release pressurized gas from said gas means, aspirator means interconnecting said valve means on said pressurized gas means and said pusher tube for controlled inflation of said upper and lower sections, and said aspirator means operative upon exhaust of all gases from said gas means to collapse said pusher tube and protect said flapper valve means.

2. An inflatable escape slide raft as set forth in claim 1 wherein said truss means includes rod means mounted on the intermediate under-surface portion of said slide structure, and cable means interconnecting said rod means with the respective ends of said slide raft.

3. An inflatable escape slide raft as set forth in claim 2 wherein said upper section has auxiliary tube means operatively connected to said upper section for inflation therefrom, and the uppermost surface portion of said auxiliary tube means being in alignment with the uppermost portion of said upper section on full inflation of said auxiliary tube means and said upper section.

4. An inflatable escape slide raft as set forth in claim 3 wherein cover means are provided for said aspirator means to limit the water intake into said pusher tube to limit the ballast effect of said pusher tube.

5. An inflatable escape slide as set forth in claim 4 wherein said lower section has a panel member that extends across the entire underneath portion thereof for cooperation with said slideway surface of said upper section to define an insulated chamber to insulate passengers on said slideway.

6. An inflatable escape slide as set forth in claim 5 wherein said chamber defined by said panel member on said lower section has check valve means for pressurization thereof.

7. An escape life raft slide assembly comprising an elongated flexible wall fluid-distensible tubular sectioned structure; said slide assembly having a slideway surface thereon for supporting passengers evacuating said aircraft, truss means secured to the underneath portion of said slide assembly for supporting said raft in its distensible condition; a distensible pusher tube connected to one end of said tubular sectioned structure for rapidly deploying said slide assembly; pressurized gas means mounted adjacent to said pusher tube for pressurizing said pusher tube and said tubular sectioned structure; aspirator means interconnecting said pusher tube and said pressurized gas means; one way valves interconnecting said pusher tube and said tubular sectioned structure to permit pressurization of said tubular sectioned structure when said pusher tube is pressurized, and said aspirator means operative to deflate said pusher tube upon exhaust of all of the fluid from said pressurized source.

8. An escape life raft slide assembly as set forth in claim 7 wherein said truss means comprises rod means having one of their ends secured to the intermediate under surface portion of said raft, cable means interconnecting the other ends of said rod means to the respective ends of said slide assembly to provide for rigid reinforcement to said raft upon full distension of said tubular sectioned structure.

9. An escape life raft slide assembly as set forth in claim 8 wherein said slide assembly has auxiliary tube means, valve means interconnecting said auxiliary tube means with said tubular sectioned structure for transferring pressurized air from said tube members to said auxiliary tube means.

10. An inflatable escape slide raft comprising an inflatable upper section and an inflatable lower section; said upper section having a slideway surface for the discharge of aircraft passengers; said escape slide raft having a cross section with a width greater than the height thereof; said upper and lower sections having a plurality of inflatable tube members extending longitudinally thereof, and a plurality of laterally extending members interconnecting said longitudinally extending tube members; said laterally extending members extendingacross the under surface of said raft to provide body and stability thereto; strut means having their one ends attached to the intermediate under surface portion of said lower section; cables extending from the respective end portions of said lower section for connection to the other ends of said struts to provide a rigid truss-like supporting means upon inflation of said upper and lower sections; an inflatable pusher tube is mounted adjacent the lower portion of one end of said lower section for rapidly deploying said slide raft, said pusher tube interconnected with said inflatable upper and lower sections with one-way valves; and said pusher tube having an aspirator interconnecting a pressurized gas source to said pusher tube to inflate said sections and subsequent deflation of said pusher tube.

* * * * *